United States Patent [19]
Gomberg

[11] Patent Number: 5,142,153
[45] Date of Patent: Aug. 25, 1992

[54] ENERGY DISCRIMINATING, RESONANT, NEUTRON DETECTOR

[75] Inventor: Henry J. Gomberg, Ann Arbor, Mich.

[73] Assignee: Penetron, Inc., Ann Arbor, Mich.

[21] Appl. No.: 698,961

[22] Filed: May 13, 1991

[51] Int. Cl.⁵ .............................. G01T 3/06; G01T 3/08
[52] U.S. Cl. ........................ 250/390.04; 250/370.05; 250/370.06; 250/390.11; 250/391
[58] Field of Search ................ 250/370.05, 370.06, 250/390.01, 390.04, 390.11, 391

[56] References Cited

U.S. PATENT DOCUMENTS

| | | | |
|---|---|---|---|
| 3,227,876 | 1/1966 | Ross | 250/370.05 |
| 3,723,726 | 3/1973 | Kozlov | 250/370.05 |
| 4,864,142 | 9/1989 | Gomberg | 250/390.04 |
| 4,918,315 | 4/1990 | Gomberg et al. | 250/390.04 |

FOREIGN PATENT DOCUMENTS

| 1014682 | 12/1965 | European Pat. Off. | 250/370.06 |
|---|---|---|---|
| 1-253683 | 10/1989 | Japan | 250/370.05 |

Primary Examiner—Constantine Hannaher
Assistant Examiner—Edward J. Glick
Attorney, Agent, or Firm—Krass & Young

[57] ABSTRACT

A neutron detector includes a constituent or added sensitizer which enhances the detector's response to neutrons, of a preselected energy. Also disclosed are analytical techniques employing the detector, including a double resonance technique.

26 Claims, 2 Drawing Sheets

ENERGY DISCRIMINATING, RESONANT, NEUTRON DETECTOR

FIELD OF THE INVENTION

This invention relates generally to the detection of neutrons. More specifically, the invention relates to a neutron detector incorporating a sensitizer which enhances its response to neutrons of a preselected energy.

BACKGROUND OF THE INVENTION

Neutron-based analytical systems are of evergrowing utility in a number of diverse areas. One particular class of neutron-based analytical systems utilizes the elastic scattering of neutrons by nuclei in an object to provide a compositional analysis of that object. Such systems permit the rapid, non-contact and non-destructive analysis of a variety of objects without inducing significant residual radioactivity therein. U.S. Pat. Nos. 4,864,142 and 4,918,315, the disclosures of which are incorporated herein by reference, disclose methods and apparatus for neutron elastic scatter based analyses. As disclosed in these patents, an object may be bombarded with a beam of fast neutrons with a small energy spread. The composition of the object is determined from the energy spectrum of neutrons scattered by the object. These systems have significant utility in the detection of contraband materials such as explosives or narcotics in luggage, vehicles, mail or other closed parcels. Systems of the type disclosed therein may also be deployed in a mobile setting for the detection and analysis of objects concealed in buildings, beneath the surface of the earth or in water.

In neutron elastic scatter analyses it is necessary to determine the energy spectrum of scattered neutrons in order to identify the scattering atoms and to calculate the atomic ratios of the elements comprising the object under interrogation and to hence ascertain its composition. In general, neutrons may be detected either by scintillation type detectors which produce a flash of light in response to interaction with a neutron; or by electronic detectors which typically include a body of semiconductor material and which provide an electrical signal, such as a current pulse or a change in resistivity, in response to interaction with a neutron. Such detectors are not capable of accurately discriminating the energies of incident neutrons. In order to provide an accurate energy spectrum of neutrons scattered by the object, various techniques are typically employed.

Neutrons are elastically scattered from a given atomic nucleus over a range of directions and with various energies. Neutrons scattered most directly back toward the source (i.e., through the largest scattering angle) will have the lowest energy whereas the neutrons scattered through a smaller angle will have higher energies. The scattering is an elastic process and for a given energy of incident neutron and a given nucleus, the energy of the scattered neutrons may be calculated as a function of position, as will be detailed hereinbelow. While this technique does provide for energy resolution of elastically scattered neutrons, it is only applicable in a system comprised of one group of scattering nuclei. In those instances where several different elements are present in the object, a series of overlapping spectra will be generated and neutrons will be scattered to a given position by a number of different elements and hence will be of different energies.

Time of flight detection techniques are frequently employed to provide energy discrimination to neutron detectors. These techniques rely upon the fact that neutrons elastically scattered from an object will travel with speeds determined by their energy. In time of flight detection a monoenergetic pulse of neutrons is directed onto an object and the detector is operated in synchrony with the pulse so as to sample the elastically scattered neutrons on a temporal, and hence energetic, basis. Time of flight techniques necessitate the use of a pulsed neutron source and furthermore require fairly large source/detector geometries and sophisticated timing circuitry if accurate readings are to be obtained.

It is clearly desirable to have a detector which is capable of providing information as to the energy of the neutrons in a steady or pulsed beam, particularly in conjunction with analytical techniques based upon neutron scatter. The detector of the present invention includes at least one sensitive material therein which enhances its response to neutrons of a preselected energy. By inclusion of the appropriate sensitive materials, the response of the detector of the present invention may be enhanced at a number of preselected neutron energies characteristic of scattering from elements of interest. The sensitive materials may be constituent elements of the detector or they may be added materials. The detector in the present invention may include one or more sensitizer elements and may be configured to respond in a spatial pattern characteristic of particular material of interest. The detector of the present invention makes possible a compact, highly accurate, low cost system for compositional analysis. The principles of the present invention may be further used in a system wherein the interrogating neutron beam energy is selected to provide a resonant enhancement of the scattering cross section of particular elements of interest. This is referred to as a dual resonance technique and will be described in greater detail hereinbelow.

BRIEF DESCRIPTION OF THE INVENTION

There is disclosed herein a neutron detector which has an enhanced response to neutrons of a preselected energy. The detector comprises a body of neutron-responsive material which operates to produce a detectable signal in response to its interaction with a neutron and further includes a sensitive material associated with at least a portion of the body of neutron-responsive material. The sensitive material has a resonance at the preselected energy which increases its neutron interaction cross section thereat as compared to its neutron interaction cross section at non-resonant energies. The neutron-responsive material of the detector may comprise a body of scintillator material which emits a photon in response to interaction of a neutron therewith or it may comprise a semiconductor or the like which provides an electrical output in response to interaction of a neutron therewith. The sensitive material may include an element selected from the group showing strong resonances such as: oxygen, magnesium, nitrogen, silicon fluorine and carbon. In a particular embodiment, the detector includes $O^{18}$ as a sensitive material and in that detector the response is enhanced at a neutron energy of 2.45 MeV.

In particular embodiments, the sensitive material is associated integrally with the body of neutron-responsive material wherein in other instances, it is disposed only in association with a portion of the body of neutron-responsive material. For example, the sensitive material may comprise a number of strips extending the width of the detector whereas in other instances, the sensitive material may comprise one or more elongated stripes running the length of the detector.

DETAILED DESCRIPTION OF THE INVENTION

I. The Detector

The present invention is directed to an improved neutron detector having a resonance enhanced response to neutrons of preselected energies The detector includes a sensitive material associated therewith which causes the detector to have a high neutron scatter cross section at the specified energy, thereby rendering the detector particularly sensitive at that energy. By the use of particular sensitive materials, detector response may be selectively enhanced with regard to a particular neutron energy. The detectors of the present invention have significant utility in the detection of particular elements by neutron-based techniques.

Neutrons are detected, in one instance, by the use of scintillation detectors comprised of inorganic materials such as diamond, which emit photons when struck by a neutron. The emitted light is then detected, typically by a photo cell or the like, to produce a signal indicative of the neutron. Another class of neutron detectors comprises materials such as silicon or other semiconductors which generate an electron-hole pair in response to impingement by a neutron and hence provide a direct electrical output which may be correlated with the neutron flux. In accord with the principles of the present invention, these various types of detectors may be fabricated from sensitive materials which include one or more constituent elements which have resonances in the range of interest or they may be provided with a distinct sensitive material which greatly enhances their response to particular energies of neutrons. If the sensitive material is separate from the detector material, it may be associated with the neutron-responsive material as a separate layer or layers or it may be integrally mixed therewith.

Figure 1:
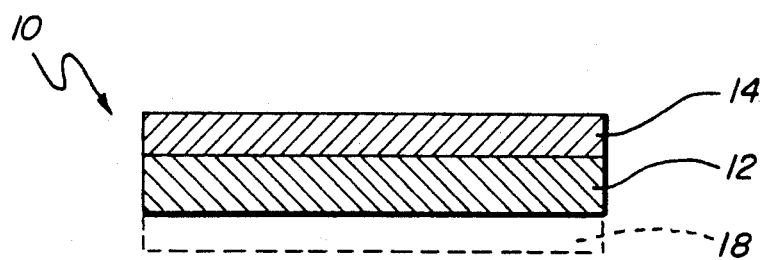
FIG. 1 is a cross-section of a neutron detector structured in accord with the principles of the present invention and illustrating a separate sensitizer layer.

Referring now to FIG. 1, there is shown a first embodiment of neutron detector 10 structured in accord with the principles of the present invention. The detector includes a body of neutron-responsive material 12 which is operative to produce a detectable signal in response to interaction thereof with a neutron flux. As noted previously, the neutron-responsive material may comprise a scintillator such as calcium fluoride or diamond, in which instance a photodetector array, shown in phantom outline at 18, will preferably be associated with the detector 10. In alternative embodiments, the body of neutron-responsive material 12 may be a material capable of providing a direct electrical signal in response to the neutron flux and as such may comprise silicon or a similar semiconductor material. In the FIG. 1 embodiment, a sensitive material is disposed in a layer 14 atop the body of neutron-responsive material 12. The sensitive layer 14 includes a material which has a resonance which increases its neutron interaction cross section at a particular, preselected energy as compared to its cross section at non-resonant energies. As will be described in greater detail hereinbelow, there are a variety of sensitizer materials which have resonances at various neutron energies and the choice of sensitive material will be mandated by the neutron energy at which enhancement of detector response is required. The sensitive layer 14 may be comprised entirely of the sensitive material or it may include a binder material. Preferably, the binder will have a minimal interaction with neutrons in the energy range being addressed by the detector.

Figure 2:
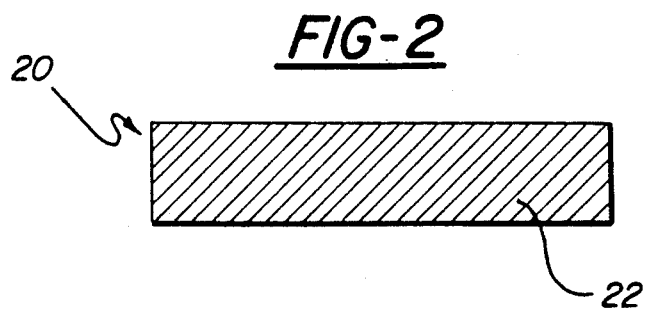
FIG. 2 is a cross-sectional view of another neutron detector structured in accord with the principles of the present invention and including a sensitive material dispersed throughout the bulk thereof.

Referring now to FIG. 2, there is shown yet another embodiment of detector 20 structured in accord with the principles of the present invention. The detector 20 of FIG. 2 includes a body of neutron-responsive material 22 having a sensitive material integral therewith. As in the previous figure, the neutron-responsive material may comprise a scintillator material or an electrically responsive material. The sensitive material may be homogeneously dispersed in the neutron-responsive material, as for example, in a solid solution or alloy form. In other instances, the detector may include a heterogenous body of neutron-responsive material and sensitive material. For example, the sensitive material may be present as a dispersion of fine particles in the body of neutron-responsive material or it may be in the form of a series of thin layers alternating with the neutron-responsive material.

The sensitive material may be associated with the entirety of the neutron-responsive body or with only a portion. In particular embodiments, the neutron-responsive body includes several different sensitive materials associated therewith to enhance its response to a combination of preselected neutron energies. The combinations of sensitive materials may be mixed and disposed uniformly with regard to the neutron-responsive body or they may be spatially separated.

Figure 3:
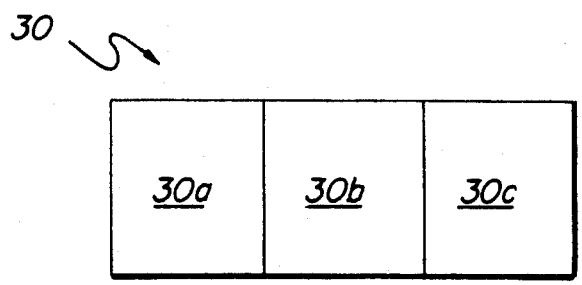
FIG. 3 is a top plan view of a detector structured in accord with the principles of the present invention and including three regions, each extending the full width of the detector and each including a different sensitive material therein.

Referring now to FIG. 3, there is shown a top plan view of one particular neutron detector 30 comprising an elongated strip including three separate regions, 30a, 30b, 30c. Each region is coextensive with the width of the detector and each includes a different sensitive material. Thus, the detector 30 of FIG. 3 exhibits an enhanced response to a number of different neutron energies in spatially separated regions thereof.

Figure 4:
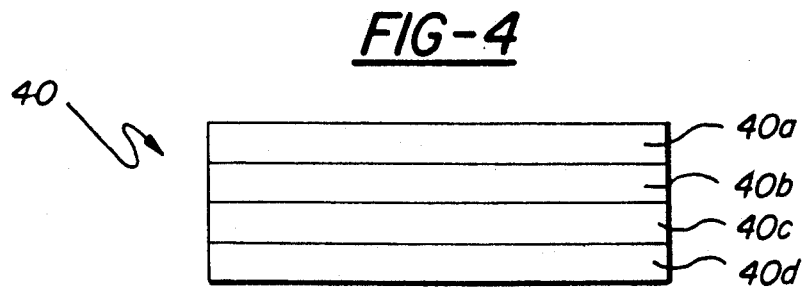
FIG. 4 is a top plan view of yet another design of detector including four regions, each including a different sensitive material therein and each coextensive with the length of the detector.

Referring now to FIG. 4, there is shown in top plan view, yet another embodiment of neutron detector 40 structured in accord with the principles of the present invention. The detector 40 of FIG. 4 includes a number of regions 40a, 40b, 40c and 40d coextensive with the length of the detector 40. Each region 40a–40d includes a different sensitive material therein The detector 40 thus exhibits a resonantly enhanced response to a plurality of different neutron energies along the entire length thereof.

II The Sensitive Material

There are a number of sensitive materials which may be employed in the practice of the present invention. A sensitive material should have a resonance which effectively increases its neutron interaction cross section at a neutron energy of interest. Appropriate sensitive materials can be selected by consultation of published data regarding neutron interaction cross sections as, for example, data published by the National Cross Section Center of the Brookhaven National Laboratory of the United States of America. Table I hereinbelow sets forth particular elements and lists some selected neutron resonances manifested by these materials it being understood that other sensitizers and other resonances may also be employed in the present invention. In general, it is desirable to utilize resonances which occur at neutron energies of up to approximately 10 MeV, since the resonance lines tend to become less marked at higher energies.

TABLE I

| Isotope | Selected Resonance MeV | | | |
|---|---|---|---|---|
| $C^{12}$ | 2.08 | 6.3 | | |
| $C^{13}$ | 2.43 | | | |
| Mg | 2.07 | 2.25 | 2.62 | |
| Na | 1.39 | 1.61 | | |
| N | 1.35 | 1.40 | 1.78 | 2.95 |
| F | 1.27 | 1.65 | | |
| $O^{16}$ | 1.83 | 1.91 | 5.13 | |
| $O^{18}$ | 2.34 | 2.43 | | |

The sensitive material may be employed in the form of the pure element, as for example, by inclusion of carbon in the detector, either as a separate layer or admixed with the neutron-responsive material as noted hereinabove. Alternatively, the sensitive material may be incorporated into a molecular species to enable easier handling thereof. For example, fluorine may be used in the form of cesium fluoride. Cesium has no resonances or other enhanced neutron interactions which would interfere with measurements in the range of interest. Similarly, sodium, oxygen and magnesium may also be employed in the form of free elements or compounds. The sensitive material may also form an integral part of the detector material itself For example, carbon can be employed in the form of diamond, either as a monolithic body or as a thin film. Techniques have recently been developed for the preparation of thin diamond and diamond-like films by the decomposition of gaseous, carbon-containing feedstocks such as hydrocarbons or halocarbons. These techniques may be readily adapted to the present invention, particularly for the preparation of $C^{13}$ based sensitive materials.

III. Detection System

The detector of the present invention may be "tuned" to exhibit a selective response to a specific neutron energy and hence may be employed to selectively emphasize particular neutron energies characteristic of scattering by elements of interest. The detector of the present invention has particular advantage in systems for the neutron interrogation and analysis of objects and as such may be employed with advantage in the systems disclosed in the above mentioned U.S. Pat. Nos. 4,864,142 and 4,918,315.

Figure 5:
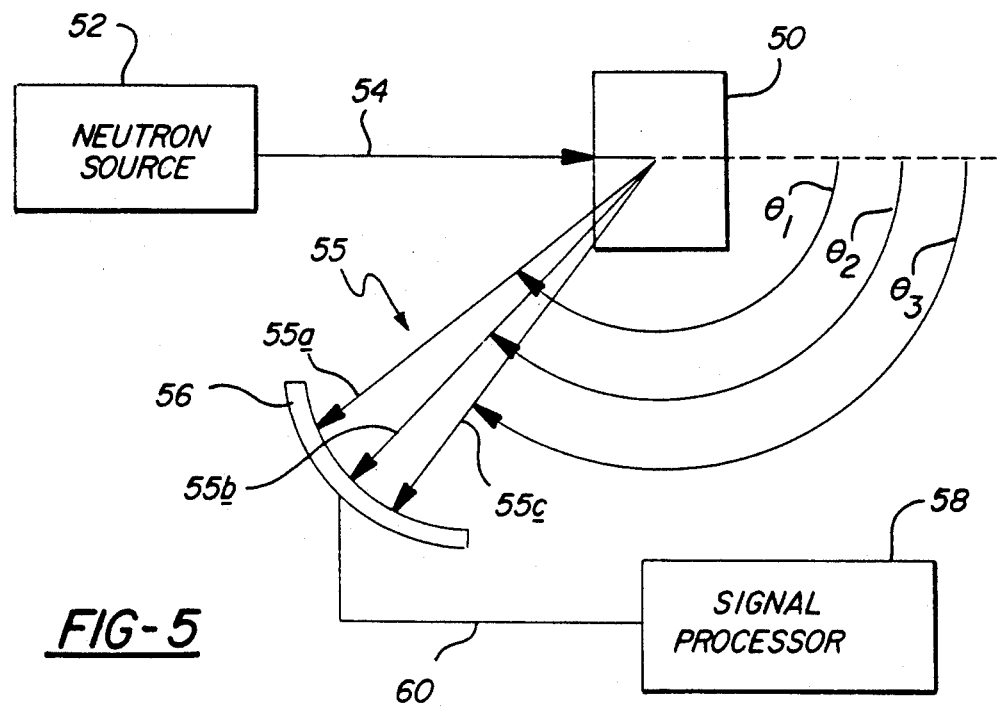
FIG. 5 is a schematic view of a detection system structured in accord with the present invention.

Referring now to FIG. 5, there is shown an analysis system, structured in accord with the principles of the present invention, and operative to analyze an object 50. The system of FIG. 5 includes a neutron source 52 disposed to project a monoenergetic beam of neutrons 54 onto the object 50 and thereby produce a group of scattered neutrons 55 which are spatially dispersed and which have a range of energies. The scattered neutrons 55 are detected by a resonantly enhanced detector 56 structured in accord with the present invention. The detector 56 is operative to produce a signal in response to the neutrons 55, which signal is communicated to a signal processor 58 via a signal line 60.

The scattered neutrons 55 exhibit a spatial energy dispersion with those neutrons scattered through the greatest angle ( e.g. beam 55a) having lower energy and those scattered at a lesser angle (e.g. beam 55c) having higher energy. The energy of the incident neutron beam 54 and the element in the object 50 from which the beam 54 is scattered will be determinative of the position and energy of the scattered neutrons 55.

A monoenergetic beam of neutrons scattered through a given angle by a first nucleus, for example oxygen, will have one particular energy whereas the same beam, scattered through the same angle by a different element, for example, nitrogen, will have a different energy. It will be appreciated that if a detector were simply measuring neutron flux as a function of scattering angle, it could not readily discriminate neutrons scattered by oxygen from neutrons scattered by nitrogen. However, utilizing the principles of the present invention, the detector may be specifically sensitized to neutrons of a particular energy and thus be capable of discriminating between the various groups of neutrons.

A particular example will illustrate the principles of the present invention.

In the apparatus of FIG. 5, a sample 50 including carbon, nitrogen and oxygen therein is bombarded with a neutron beam 54 of 1.783 MeV. Theta represents the angle through which neutrons are scattered in the elements by the object 50. Theta may be calculated by the following equation:

$$\cos\theta \frac{A}{T_1} = \frac{T_3(A-1) - T_1(A-1)}{2(T_3T_1)^{\frac{1}{2}}}$$

wherein A is the atomic number of the scattering element; $T_1$ is the incident neutron energy; and $T_3$ is the energy of the scattered neutron. In the FIG. 5 embodiment, the detector 56 includes sodium as a sensitizer element. Sodium has a resonance at 1.393 MeV and for the present calculation, $T_3$ is assigned this value. Carrying out the calculation, it is determined that 1.393 MeV neutrons resultant from the scattering of a 1.783 MeV neutron beam will be scattered through an angle $\theta_1$ of 166° by oxygen, an angle $\theta_2$ of 136° by nitrogen, and an angle of $\theta_3$ of 118.5° by carbon. In the illustration of FIG. 5, three groups of scattered neutrons 55a, 55b and 55c are representative of 1.393 MeV neutrons scattered by oxygen, nitrogen and carbon, respectively. The combination of responses at these particular angles, in a sodium-sensitized detector will indicate the combination of C, 0 and N in the object Quantification of the responses will enable a ratio of the three elements in the object 50 to be determined.

It is to be understood that neutrons of other energies may be scattered to the same locations on the detector 56 as are the 1.393 MeV beams 55a, 55b, 55c; however, the fact that the detector 56 is made particularly sensitive to this specific energy Of neutron enables the analysis to be accurately carried out in spite of the low level of interference from other energies of neutrons. According to prior art techniques, such energy discrimination is best done by the use of time of flight techniques which exploit the fact that neutrons of different energies travel at different speeds in a fixed medium. In prior art techniques, the neutron beam 54 must be pulsed and the detector must be operated in synchrony with the pulsed beam so as to reject all neutrons not having a desired energy. Time of flight techniques require fairly long paths of travel for the neutrons and require the use of sophisticated control circuitry and processing software. The present invention allows for the analysis of a plurality of elements in a single sample by a relatively simple apparatus and technique.

It will be noted from Table I that the sensitive elements generally have a number of resonance peaks and this fact may be exploited to identify and quantify particular elements in the target object For example, nitrogen is known to have resonances at 1.35 and 1.40 MeV. Utilizing the formula hereinabove, it may be calculated that a neutron beam of 1.783 MeV will be elastically scattered from nitrogen through an angle of 159.9° at an energy of 1.35 MeV and through an angle of 131.7° at an energy of 1.40 MeV. Detection of signals at these two respective angles in a nitrogen sensitized neutron detector will provide a pattern indicative of nitrogen in the object.

As noted hereinabove, the detectors of the present invention may be configured to have spatially separated regions sensitive to different neutron energies and thus a detector may be "tuned" to give a unique response to preselected combinations of elements. Thus a detector may be adapted to provide a signature which is characteristic of explosives, narcotics or other species of interest.

While the detectors in the foregoing figures are generally shown as elongated strips, it should be kept in mind that neutrons are scattered from an object in a generally hemispherical distribution. Therefore, the total of those neutrons scattered from an object at a particular angle will define a cone with its vertex at the object. As a consequence, other detector geometries such as a plate or hemispherical cap may be employed.

Figure 6:
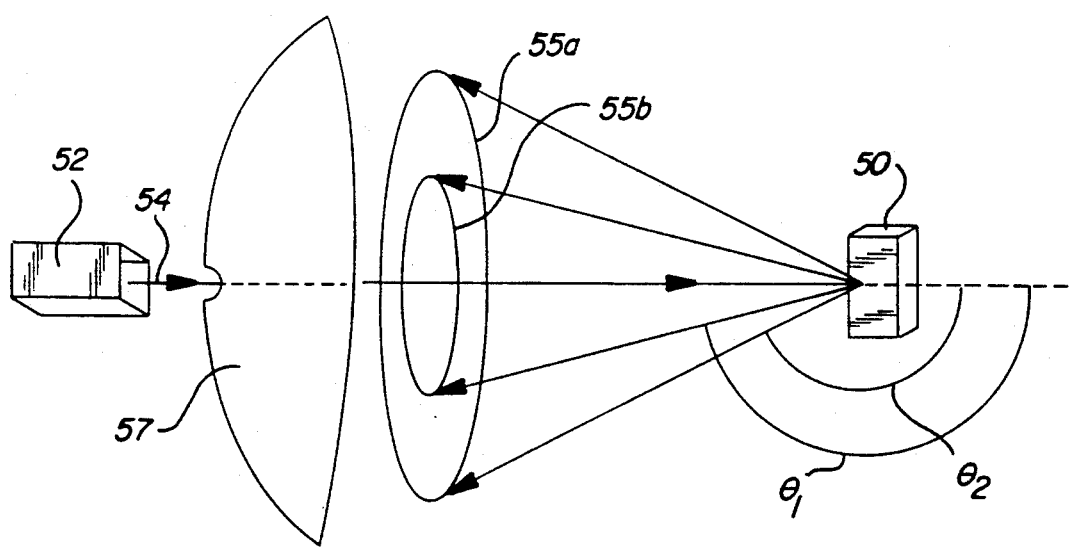
FIG. 6 is a schematic depiction, in perspective, of a detection system generally similar to that of FIG. 5.

Referring now to FIG. 6, there is shown a schematic view, in perspective of an apparatus generally similar to that of FIG. 5, including a neutron source 52 disposed to impinge a beam of neutrons 54 onto an object 50. It will be noted that the neutrons scattered through a first particular angle, for example $\theta$, define a cone 5a while those scattered through a second angle $\theta_2$ define a second cone 55b. A single, hemispherical "cap" detector 57 having at least a portion thereof fabricated from neutron-responsive material may be disposed to intercept these cones of neutrons. Alternatively, the detector may comprise a single plate disposed to intercept the scattered neutrons. A large area scintillation detector of this type will produce one or more concentric circles of light corresponding to the variously scattered neutrons. If the detector includes a sensitive material, in accord with the present invention, the detector will show one or more "rings" of enhanced response corresponding to the resonance enhanced response thereof. A particular ring pattern may be correlated with the nature of the scattering species in the target. Clearly, other detector geometries, such as a hemisphere or the like may be similarly employed. The detector may be subdivided into a plurality of individually addressed sub cells or pixels to allow for processing of the detector signal.

IV. Double Resonance

As noted hereinabove, and as discussed in Pat. No. 4,918,315, many elements have resonance peaks in their scatter spectra. That is to say neutrons having certain energies are elastically scattered more efficiently from those atoms than are neutrons with different energies. This phenomenon may be exploited to further increase the sensitivity of a neutron detection system. For example, nitrogen scatters neutrons of 1.116 MeV, 1.783 MeV and 3.0 MeV with a greater intensity than do other elements. Similarly, carbon exhibits resonances in its elastic scatter cross section at 2.088 MeV and 2.95 MeV. Similar resonances exist for other elements. By the use of monoenergetic neutrons having an energy equal to the resonance energy of a species of interest, the precision of the technique with regard to that species is greatly enhanced.

In the example of FIG. 5, the beam 54 has an energy of 1.783 MeV which is the resonant scattering energy of nitrogen and accordingly, the group of scattered neutrons 55b corresponding to the 1.39 MeV neutrons scattered by nitrogen will be further enhanced with regard to those 1.39 MeV neutrons scattered by oxygen (55a) as well as those scattered by carbon (55c). Also, as noted hereinabove, the 1.39 MeV neutrons scattered by C, O and N will each be scattered through a different angle; hence, there is a particular spatial and energy distribution to the scatter spectrum of each particular element. Clearly, the technique may be employed in combination with the sequential impingement of different energies of neutron beam corresponding to resonances of various elements in the object, to obtain a very accurate and precise measurement of composition of the object.

It will thus be appreciated that the present invention provides for a detector and an analysis system which may be specifically tuned to provide an output signal characteristic of particular elements and particular combinations of elements. The present invention eliminates the need for time of flight analysis in neutron analytical systems, thereby greatly simplifying their geometry, hardware and data processing. Furthermore, double resonance techniques may be advantageously employed to further increase the accuracy and precision of such apparatus.

It will be appreciated that while the principles of the present invention have been described with regard to particular resonance energies and particular sensitizers, resonant elastic scattering of neutrons is a well documented phenomenon in an extensive series of material. Presently available data, for example data published in Brookhaven National Laboratory Report, No. 325 and data published by the National Bureau of Standards of the United States of America as well as other data generally available to those of skill in the field of nuclear physics, may be employed to select various other sensitizers and neutron resonance energies. In view of the foregoing, it is to be understood that the present invention may be generally practiced in connection with a variety of material and apparatus. The foregoing discussion, description, drawings and examples are illustrative of the present invention and not limitations upon the practice thereof. It is the following claims, including all equivalents, which define the scope of the invention.

I claim:

1. A neutron detector having an enhanced response to neutrons of a preselected energy, said detector comprising:
   a body of neutron-responsive material operative to produce a detectable signal in response to the interaction of a neutron therewith;
   a sensitive material associated with at least a portion of said body of neutron-responsive material, said sensitive material having a resonance at said preselected energy which increases its neutron interaction cross section thereat as compared to its neutron interaction cross section at non-resonant energies.

2. A neutron detector as in claim 1, wherein said body of neutron-responsive material comprises a body of scintillator material operative to emit a photon in response to the interaction of a neutron therewith.

3. A neutron detector as in claim 1, wherein said body of neutron-responsive material is operative to produce an electrical signal in response to the interaction of a neutron therewith.

4. A neutron detector as in claim 3, wherein said body of neutron-responsive material is a body of semiconductor material.

5. A neutron detector as in claim 1, wherein said sensitive material is a constituent element of said body of neutron-responsive material.

6. A neutron detector as in claim 1, wherein said sensitive material is distinct from said body of neutron-responsive material.

7. A neutron detector as in claim 6, wherein said sensitive material is associated integrally with the body of neutron-responsive material.

8. A neutron detector as in claim 6, wherein said sensitive material is in a layer disposed upon at least a portion of said body of neutron-responsive material.

9. A neutron detector as in claim 1, wherein said sensitive material includes $O^{18}$, said material having a resonance at a neutron energy of 2.45 MeV.

10. A neutron detector as in claim 1, wherein said sensitive material includes F, said material having several resonances including one at a neutron energy of 2.5 MeV.

11. A neutron detector as in claim 1, wherein said sensitive material includes $C^{13}$, said material having a resonance at a neutron energy of 2.43 MeV.

12. A neutron detector as in claim 1, wherein said sensitive material includes Mg, said material having several resonances including one at a neutron energy of 2.26 MeV.

13. A neutron detector as in claim 1, wherein said sensitive material comprises an alkaline earth fluoride.

14. A neutron detector as in claim 13, wherein said alkaline earth fluoride comprises magnesium fluoride.

15. A neutron detector as in claim 1, further including a second sensitive material associated with at least a portion of the body of neutron-responsive material, said second sensitive material having a resonance at a second preselected energy, which resonance increases its neutron elastic scattering cross section thereat as compared to its neutron elastic scattering cross section at non-resonant energies.

16. A neutron detector as in claim 1, wherein said body of neutron-responsive material is configured as an elongated strip.

17. A neutron detector as in claim 16, wherein said sensitive material is associated with only portions of said elongated strip.

18. A neutron detector as in claim 17, wherein said sensitive material is disposed in a portion coextensive with a length of said strip.

19. A neutron detector as in claim 17, wherein said sensitive material is disposed in a portion coextensive with the width of said elongated strip.

20. A neutron detector as in claim 1, wherein said body of neutron-responsive material is configured as a plate.

21. A neutron detector as in claim 1, further including a cap member, said body of neutron-responsive material disposed on at least a portion of said cap member.

22. A method of detecting a preselected element in an object, said method including the steps of:
   providing a monoenergetic beam of neutrons having an energy corresponding to a neutron resonance scattering energy of said preselected element;
   bombarding said object with the monoenergetic beam, whereby at least a portion of said neutrons are elastically scattered by said element, said scattered neutrons having a plurality of energies which vary with the scatter angle;
   providing a neutron detector, said detector having an enhanced response to neutrons of a preselected energy corresponding to one of said energies of the scattered neutrons, said detector comprising:
   a body of neutron-responsive material operative to provide a detector signal in response to the interaction of a neutron therewith;
   a sensitive material associated with at least a portion of said body of neutron-responsive material, said sensitive material having a resonance at said preselected energy which increases its neutron elastic scattering cross section as compared to its neutron elastic scattering cross section at non-resonant energies;
   disposing said detector at a preselected angular location so that it is impinged by at least a portion of said elastically scattered neutrons; and
   detecting at least said portion of elastically scattered neutrons at said preselected energy and scatter angle.

23. A method as in claim 22, wherein said preselected element is nitrogen and the step of providing a monoenergetic beam of neutrons comprises providing a beam of neutrons having an energy of 3.2 MeV and the step of providing said neutron detector comprises providing a detector including a sensitive material having a resonance at a preselected energy selected from the group consisting of 2.5 MeV, 2.45 MeV and 2.43 MeV.

24. A method as in claim 22, wherein said preselected element is nitrogen and the step of providing a monoenergetic beam of neutrons comprises providing a beam having an energy of 1.78 MeV and the step of providing said neutron detector comprises providing a detector including a sensitive material having a resonance at a preselected energy in the range of 1.34 MeV to 1.54 MeV.

25. A method as in claim 24, wherein the step of providing a detector comprises providing a detector including sodium as said sensitive material, said sodium having a resonance at 1.39 MeV.

26. An apparatus for detecting a preselected element in an object, said apparatus including:

a source of monoenergetic neutrons having an energy corresponding to a neutron resonance scattering energy of said preselected element;

means for supporting said object in said monoenergetic beam so that neutrons are elastically scattered therefrom, said scattered neutrons having a plurality of energies and an associated angle of scatter for each of said energies;

a neutron detector having an enhanced response to a preselected energy of said elastically scattered neutrons, said detector comprising:

a body of neutron-responsive material operative to produce a detector signal in response to the interaction of a neutron therewith; and a sensitive material associated with at least a portion of said body of neutron-responsive material, said sensitive material having a resonance at said preselected energy which increases its neutron elastic scattering cross section thereat as compared to its neutron elastic scattering cross section at non-resonance energies; and means for supporting said detector so that it is impinged by at least a portion of said elastically scattered neutrons.

* * * * *